United States Patent [19]

Tomite

[11] Patent Number: 4,469,969
[45] Date of Patent: Sep. 4, 1984

[54] PERMANENT MAGNET FIELD TYPE STARTING MOTOR PROVIDED WITH AN AUXILIARY

[75] Inventor: Tosio Tomite, Katsuta, Japan

[73] Assignee: Hitachi, Ltd., Tokyo, Japan

[21] Appl. No.: 358,212

[22] Filed: Mar. 15, 1982

[30] Foreign Application Priority Data

Mar. 17, 1981 [JP] Japan ............................ 56-38999

[51] Int. Cl.³ ............................................. H02K 21/28
[52] U.S. Cl. .................................... 310/154; 335/302
[58] Field of Search ............... 310/154, 186, 187, 188, 310/190, 191, 258; 335/296, 302

[56] References Cited

U.S. PATENT DOCUMENTS

| | | | |
|---|---|---|---|
| 3,567,979 | 3/1971 | Jaffe | 310/154 |
| 3,594,599 | 7/1971 | West | 310/258 |
| 4,110,718 | 8/1978 | Odor et al. | 335/296 |
| 4,237,397 | 12/1980 | Mohr et al. | 310/154 |
| 4,383,193 | 5/1983 | Tomite et al. | 310/154 |

FOREIGN PATENT DOCUMENTS

| | | | |
|---|---|---|---|
| 2267649 | 11/1975 | France | 310/154 |
| 48-35721 | 10/1973 | Japan . | |

*Primary Examiner*—J. D. Miller
*Assistant Examiner*—D. L. Rebsch
*Attorney, Agent, or Firm*—Antonelli, Terry & Wands

[57] ABSTRACT

A permanent field type starting motor is provided with a permanent magnet, and a non-permanent magnet auxiliary pole which has higher reversible permeability than that of the permanent magnet. The auxiliary pole is disposed in the circumferential direction of the inner circumference of a yoke and on the magnetizing side of armature reaction relative to the center of the pole. The pole arc ratio of the auxiliary pole with respect to the center angle of the field is selected in a range from 0.07 to 0.4.

12 Claims, 7 Drawing Figures

PERMANENT MAGNET FIELD TYPE STARTING MOTOR PROVIDED WITH AN AUXILIARY

BACKGROUND OF THE INVENTION

This invention relates to a car starting motor and more particularly, to a permanent magnet field type starting motor provided with an auxiliary pole in which an auxiliary pole and a permanent magnet are juxtaposed with each other.

It is known to juxtapose an auxiliary pole with, and close to, a permanent magnet for improving the torque characteristic of a permanent magnet field type d.c. motor, as disclosed in Japanese Patent Publication No. 35721/1973. This auxiliary pole is mounted on the magnetizing side of armature reaction, and consequently, to torque characteristic markedly changes with the pole are ratio and position of juxtaposition of the auxiliary pole. The pole arc ratio is expressed by either the ratio of the center angle $\theta_3$ of the auxiliary pole to the center angle $\theta_2$ of the field, i.e., $\theta_3/\theta_2$, or the ratio of the center angle $\theta_3$ of the auxiliary pole to the center angle $\theta_1$ of one pole.

The abovementioned reference does not describe in detail the position and size of the auxiliary pole but merely states that the region affected by the demagnetizing action of the armature reaction is set to the width of the auxiliary pole. The reference neither stipulates the optimum size of the auxiliary pole, nor clarifies its effect.

SUMMARY OF THE INVENTION

The present invention is directed to provide an economical and high performance permanent magnet field type starting motor equipped with an auxiliary pole which is capable of improving the torque at starting. The starter in accordance with the present invention is characterized in that an auxiliary pole having a pole arc ratio of the auxiliary pole to the center angle of the field of 0.07 to 0.4 is mounted on the magnetizing side of the armature reaction to the pole center.

DESCRIPTION OF THE PREFERRED EMBODIMENT

Figure 1:
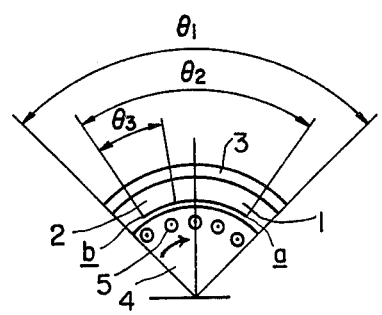
FIG. 1 is a schematic view explaining the construction of a car engine starter.

FIG. 1 is a diagram useful for explaining the construction of a car engine starter. The permanent magnet 1 and the auxiliary pole 2 are shown juxtaposed with each other without an air gap in the circumferential direction of the inner surface of a cylindrical yoke 3 and an armature 4 having a coil wound on it is rotatably disposed so as to oppose the magnet and the pole. The permanent magnet 1 is made of an anisotropic ferrite while the auxiliary pole 2 is made of a non-permanent material having higher reversible permeability such as mild iron, for example. Though this diagram shows only the range of 90°, the other quadrants have the same construction as above.

If symbols $\theta_1$, $\theta_2$ and $\theta_3$ are hereby assumed to represent the center angle described (subtended) by this pole, the center angle described between the permanent magnet 1 and the auxiliary pole 2, and the center angle of the auxiliary pole 2, respectively, $\theta_3/\theta_2$ and $\theta_3/\theta_1$ represent the pole arc ratios of the auxiliary pole with respect to $\theta_2$ and $\theta_1$, respectively. In small d.c. machines in general, the pole arc ratio of the field $\theta_2/\theta_1$ is ordinarily from 0.65 to 0.8. Hence, this embodiment also sets the pole arc ratio $\theta_2/\theta_1$ to 0.75 and deals with a starter in which the outer diameter of the yoke is 80 mm, that of the armature 4 is 60 mm, the number of armature slots is 21 and the number of poles is 4. The armature 4 rotates in the direction indicated by the arrow provided on the armature in FIG. 1.

Figure 2:
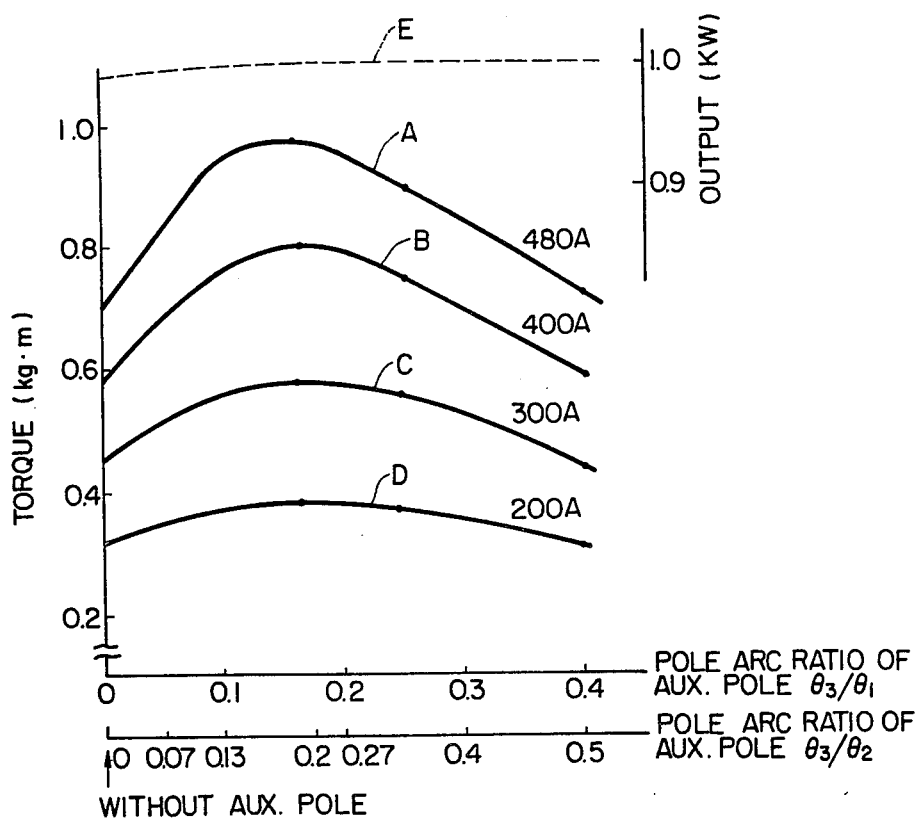
FIG. 2 is a diagram showing the relation between the pole arc ratio of the auxiliary pole and the armature torque.

FIG. 2 is a diagram that shows the relation between the pole arc ratio of the auxiliary pole and the armature torque. The abscissa represents the pole arc ratios of the auxiliary pole $\theta_3/\theta_2$ and $\theta_3/\theta_1$ and the ordinate represents the torque in units of Kg.m. If it is assumed that a current flows through the coil 5 of the armature 4 of FIG. 1 from the back to the surface of the drawing, armature reaction is generated in the counterclockwise direction in accordance with Fleming's lefthand rule, so that the strongest demagnetizing field acts upon the end portion a of the permanent magnet 1, and the strongest magnetizing field acts upon the end portion b of the auxiliary pole 2. In this instance, the right-handed portion is demagnetized while the left-handed portion is magnetized with the center of the center angle $\theta_2$ of the field being the center. Accordingly, the armature 4 is allowed to rotate by the magnetic flux of the permanent magnet 1 after being demagnetized and by the pole 2 and the magnetic flux of the permanent magnet 1, both being magnetized.

Curves A, B, C and D represent the actually measured torque when the current permitted to flow through the armature 4 was 480A, 400A, 300A, and 200A, respectively. In any of the curves, the pole arc ratio of the auxiliary pole $\theta_3/\theta_2$ exhibited the maximal torque at around 0.2. The extreme left of the abscissa represents the case in which the auxiliary pole 2 was not disposed. The torque of the curve A in this case was about 0.7 kg.m. The maximal value 0.97 kg.m exhibited 30% rise. The dash line at the uppermost portion of FIG. 2 represents the output when a 200A current was allowed to flow through the coil of the armature 4, and the ordinate locally drawn on the right side represents the output value in terms of kW.

Now, the starter output P is expressed by the following equation:

$$P = 2 \frac{V - (R_m + R_B)I_a}{\frac{P}{a} \cdot \phi \cdot Z} \times 60 \cdot \frac{1}{2} \cdot \frac{P}{a} \cdot \phi \cdot Z \cdot I_a \cdot \frac{1}{9.74} \quad (1)$$

where:
V: terminal voltage,
$R_m$: internal resistance of motor,
$R_B$: internal resistance of battery,
$I_a$: current flowing through coil of armature,
P: number of poles,
a: number of parallel circuits,
$\phi$: magnetic flux,
Z: number of conductors.

As can be appreciated from this equation, P does not change much unless $R_m$, $R_B$ and $I_a$ change. Hence, it describes a line such as E in FIG. 2.

However, there is the following relation between the output P, the torque $T_q$ and the number of revolutions N:

$$P = 1.027 T_q N \quad (2)$$

In other words, the output P is almost irrelevant to the existence of the auxiliary pole 2 but in the case of the car starter, a large torque is required at the start and optimization of the auxiliary pole 2 is extremely effective for improving the starting performance of the engine.

Figure 3:
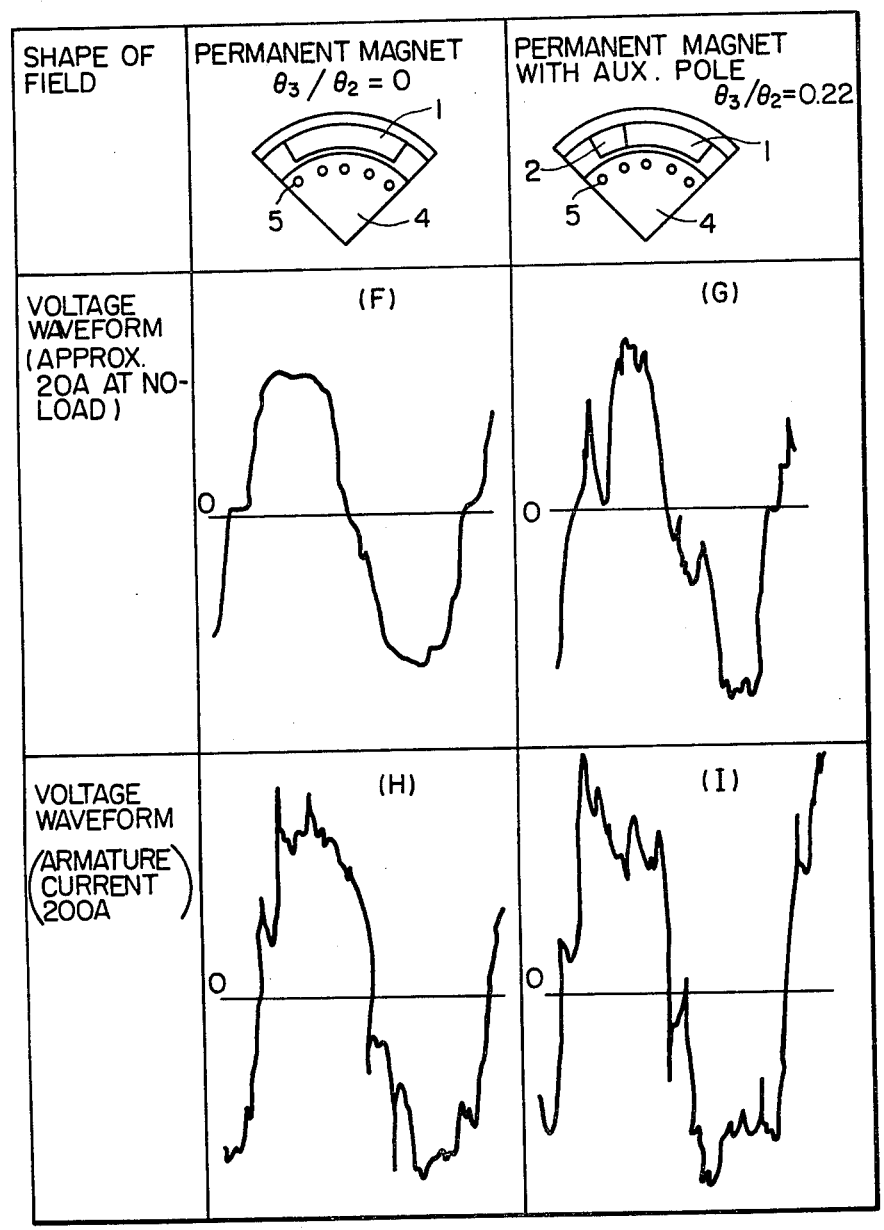
FIG. 3 is a diagram showing the relation between the auxiliary pole and the operating conditions.

FIG. 3 is a diagram showing comparatively the operating conditions with the existence of the auxiliary pole. The right and left columns represent the differences resulting from the existence of the auxiliary pole and the upper and lower columns represent the differences in the voltage waveforms between the no-load operation and the operation with the load. This experiment was carried out in order to clarify the point at which the width of the auxiliary pole 2 was most effective for improving the torque, by measuring the voltage waveform between the commutator of the armature 4 and the coil 5.

As is obvious from this diagram, the armature reaction is small at the time of no-load operation. Hence, the voltage waveform of the permanent magnet field starter equipped with the auxiliary pole is such that the magnetic flux decreases at the auxiliary pole 2 such as shown in FIG. 3(G) and is more distorted in comparison with the case of FIG. 3(F) where the permanent magnet 1 alone is used.

Next, when the current is allowed to flow through the coil 5 of the armature 4, the armature reaction increases so that the magnetic flux increases also at the position of the auxiliary pole 2 and the generated voltage shown in FIG. 3(I) becomes greater than those shown in FIG. 3(G) and 3(H). From this, it is obvious that in the permanent magnet field starter equipped with the auxiliary pole, the torque can be improved even when the current, which is permitted to flow through the coil 5 of the armature 4, is the same. This can also be confirmed from the gap flux distribution between the armature 4 and the magnetic pole that will be described in the following paragraph.

Figure 4:
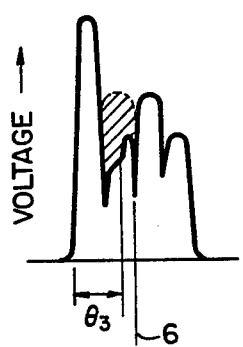
FIGS. 4(J) through 4(M) are diagrams showing the relation between the voltage waveforms of FIG. 3 and the gap flux distribution waveforms.
Figure 4:
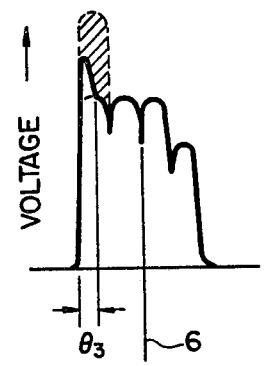
Figure 4:
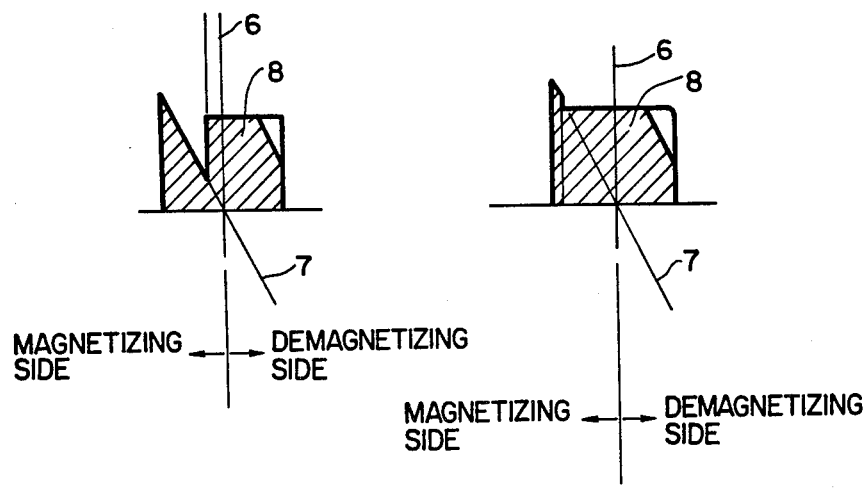

FIG. 4 schematically illustrates the voltage waveform of FIG. 3 and the gap flux distribution waveform and represents the relation between the size of the auxiliary pole 2 and the voltage waveform. FIG. 4(J) represents the case in which the center angle $\theta_3$ of the auxiliary pole 2 is increased. The auxiliary pole 2 extends to the proximity of the center line 6 of the pole. The left-sided portion of the center line 6 represents the magnetizing side while the right-sided portion represents the demagnetizing side. Hence, the change in the gap magnetic flux due to the armature reaction is represented by a line 7 in FIG. 4(L), and the shape of the gap flux density 8 represented by hatching describes a notch near the pole center line 6 and at the same time, its right shoulder portion is slantly cut off due to the drop of the flux as it is affected by the demagnetizing field. The area of the gap flux density 8 represented by hatching decreases when the auxiliary pole 2 is increased close to the pole center line 6, and the torque also decreases. In FIG. 4(J), the hatched range represents the voltage drop corresponding to the notch of FIG. 4(L) and plural partition lines are generated by the partitions of the grooves into which the coil 5 is inserted. The ridge on the extreme right of FIG. 4(J) is lowered as it is affected by the inclination of the right shoulder of FIG. 4(L).

FIG. 4(K) illustrates the case where the cener angle $\theta_3$ of the auxiliary pole is reduced, and the auxiliary pole 2 is so positioned as to be spaced apart from the pole center 6. Hence, the line 7 representing the change in the gap flux density 8 due to the armature reaction does not describe a notch on the magnetizing side as shown in FIG. 4(M), is connected to the magnetizing side of the permanent magnet 1, and thus increases the gap flux density 8.

From the result of experiment shown in FIGS. 3 and 4, when the center angle $\theta_3$ of the auxiliary pole 2 is so set as to attain about 0.2 in terms of the pole arc ratio $\theta_3/\theta_2$, the hatched area or the gap flux density 8 between the permanent magnet 1 and the auxiliary pole 2, becomes greatest. This can also be estimated from the waveform shown in FIG. 3(I).

The permanent magnet field starter equipped with the auxiliary pole in this embodiment increases the torque at the start by about 30% as compared to when the auxiliary pole is not used, and markedly improves the starting performance, if it is so arranged that the ratio of the center angle $\theta_3$ of the auxiliary pole to that $\theta_2$ of the field range is about 0.2.

On the curve A of FIG. 2, the torque is 0.83 kg.m when the pole arc ratio of the auxiliary pole $\theta_3/\theta_2$ is 0.07 and 0.82 kg.m when the latter is 0.4. These values correspond to about a 10% increment with respect to the torque value of 0.75 kg.m of the prior art device not equipped with the auxiliary pole 2. This means that when the center angle $\theta_2$ of the field is predetermined, torque and start performance can be improved by setting the ratio $\theta_3/\theta_2$ within the range of 0.07 to 0.4.

The permanent magnet field starter equipped with the auxiliary pole in accordance with the present invention provides improvement of torque at starting.

I claim:

1. In a permanent field type starting motor including a yoke, a permanent magnet disposed in the circumferential direction of the yoke, an auxiliary pole made of a magnetic material having higher reversible permeability than that of the permanent magnet, the auxiliary pole being juxtaposed with and close to the permanent magnet and disposed on the magnetizing side of the armature reaction relative to the pole center, the improvement wherein the auxiliary pole has a pole arc ratio ranging from 0.07 to 0.4 with respect to the center angle of the field and is formed of a non-permanent magnetic material.

2. In a permanent field type starting motor as claimed in claim 1, the permanent magnet is made of an anisotropic ferrite.

3. In a permanent field type starting motor as claimed in claim 1, the auxiliary pole is made of mild iron.

4. A dynamoelectric machine comprising a yoke, a stator disposed at the circumference of said yoke, and an armature rotatably supported in said yoke for rotation relative to said stator for generation of an armature reaction against magnetic flux from said stator, said stator including an auxiliary pole made of a non-permanent magnetic material disposed at a portion of said stator wherein said armature reaction causes a magnetization against the magnetic flux from said stator to such an extent that the magnetized distribution exceeds the demagnetized flux distribution demagnetized by the armature reaction, said stator including a permanent magnet material pole juxtaposed with said auxiliary pole without an air gap therebetween.

5. A dynamoelectric machine comprising yoke means, stator means disposed at the circumference of said yoke means, and armature means rotatably supported in said yoke means for rotation relative to said stator means for generating an armature reaction against magnetic flux from said stator means, said stator means including means forming an auxiliary pole and made of a non-permanent magnetic material disposed at a part of said stator means where the armature reaction provides for a magnetization against teh magnetic flux from said stator means to such an extent that the magnetized flux distribution differs from the demagnetized flux distribution demagnetized by the armature reaction to provide a substantially uneven flux distribution, said stator means further including pole means made of a permanent magnet material in juxtaposition with said auxiliary pole means without an air gap therebetween.

6. A dynamoelectric machine as claimed in claim 5, wherein said auxiliary pole means provides for the magnetized flux distribution to exceed the demagnetized flux distribution.

7. A dynamoelectric machine as claimed in claim 6, wherein said pole means made of a permanent magnet material is disposed so that the armature reaction causes a demagnetization against the magnetic flux from said stator means at least along a portion of said pole means.

8. A dynamoelectric machine as claimed in claim 7, wherein said auxiliary pole means and said pole means are positioned in said stator means for enabling an increase in torque of the dynamoelectric machine at the starting thereof.

9. In a permanent field type starting motor as claimed in claim 1, the auxiliary pole is disposed only on the magnetizing side of the armature reaction relative to the pole center.

10. A dynamoelectric machine as claimed in claim 4, wherein the dynamoelectric machine is a permanent field type starting motor, said auxiliary pole having higher reversible permeability than that of said permanent magnet pole, said auxiliary pole being disposed only on the magnetizing side of the armature reaction relative to the pole center, said auxiliary pole having a pole arc ratio ranging from 0.07 to 0.4 with respect to the center angle of the field.

11. A dynamoelectric machine as claimed in claim 5, wherein the dynamoelectric machine is a permanent field type starting motor, said auxiliary pole means having higher reversible permeability than that of said permanent magnet pole means, said auxiliary pole means being disposed only on the magnetizing side of the armature reaction relative to the pole center, said auxiliary pole means having a pole arc ratio ranging from 0.07 to 0.4 with respect to the center angle of the field.

12. A dynamoelectric machine as claimed in claim 11, wherein said auxiliary pole means has a pole arc ratio of about 0.2.

* * * * *